United States Patent [19]

Ushimaru

[11] Patent Number: 5,354,515

[45] Date of Patent: Oct. 11, 1994

[54] DOMESTIC ELECTRIC APPLIANCE

[75] Inventor: Shigeo Ushimaru, Tokyo, Japan

[73] Assignee: Kabushiki Kaisha Toshiba, Kawasaki, Japan

[21] Appl. No.: 1,776

[22] Filed: Jan. 8, 1993

[30] Foreign Application Priority Data

Jan. 13, 1992 [JP] Japan ............................ 4-003554

[51] Int. Cl.⁵ .............................................. B01F 3/04
[52] U.S. Cl. .................................... 261/72.1; 261/81; 261/DIG. 48; 261/DIG. 46; 204/182.5
[58] Field of Search ................ 261/DIG. 48, 81, 72.1, 261/DIG. 46; 204/182.5

[56] References Cited

U.S. PATENT DOCUMENTS

| | | | |
|---|---|---|---|
| 3,084,113 | 4/1963 | Vallino | 204/182.5 |
| 3,192,143 | 6/1965 | Roe et al. | 204/182.5 |
| 3,461,060 | 8/1969 | Nellen | 204/182.5 |
| 3,690,317 | 9/1972 | Millman | 261/DIG. 48 |
| 3,725,233 | 4/1973 | Smith | 204/182.5 |
| 3,776,530 | 12/1973 | Griffith et al. | 261/DIG. 48 |
| 4,257,989 | 3/1981 | Nishikawa | 261/DIG. 46 |
| 4,663,091 | 5/1987 | Seo | 261/DIG. 46 |
| 4,749,389 | 6/1988 | Wowag | 261/29 |

FOREIGN PATENT DOCUMENTS

0272540 12/1986 Japan .................... 261/DIG. 48

OTHER PUBLICATIONS

James, "Encyclopedia for Water Treatment Technology," (S.Naitoh's trans.), pp. 130–133 (1969).

Primary Examiner—Tim Miles
Attorney, Agent, or Firm—Foley & Lardner

[57] ABSTRACT

A domestic electric appliance comprises a water purifier employing an electrodialyzer. The electrodialyzer includes an anode, a cathode, cation exchange films, and anion exchange films. The cation and anion exchange films are alternately arranged between the anode and the cathode and serve as partition walls. The domestic electric appliance further comprises a unit for using the water purified by the water purifier.

5 Claims, 7 Drawing Sheets

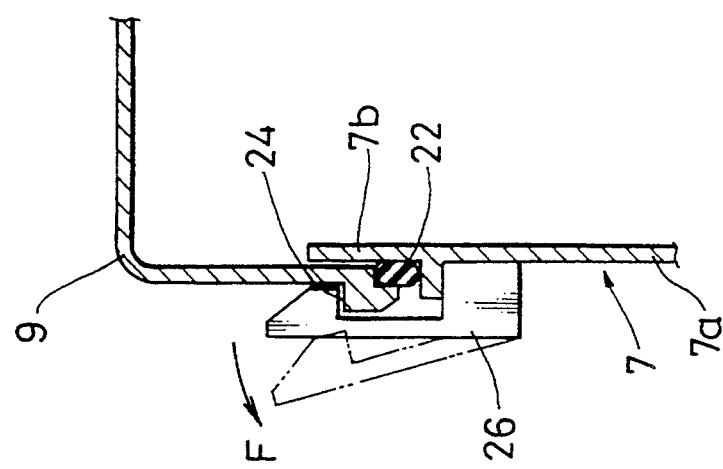
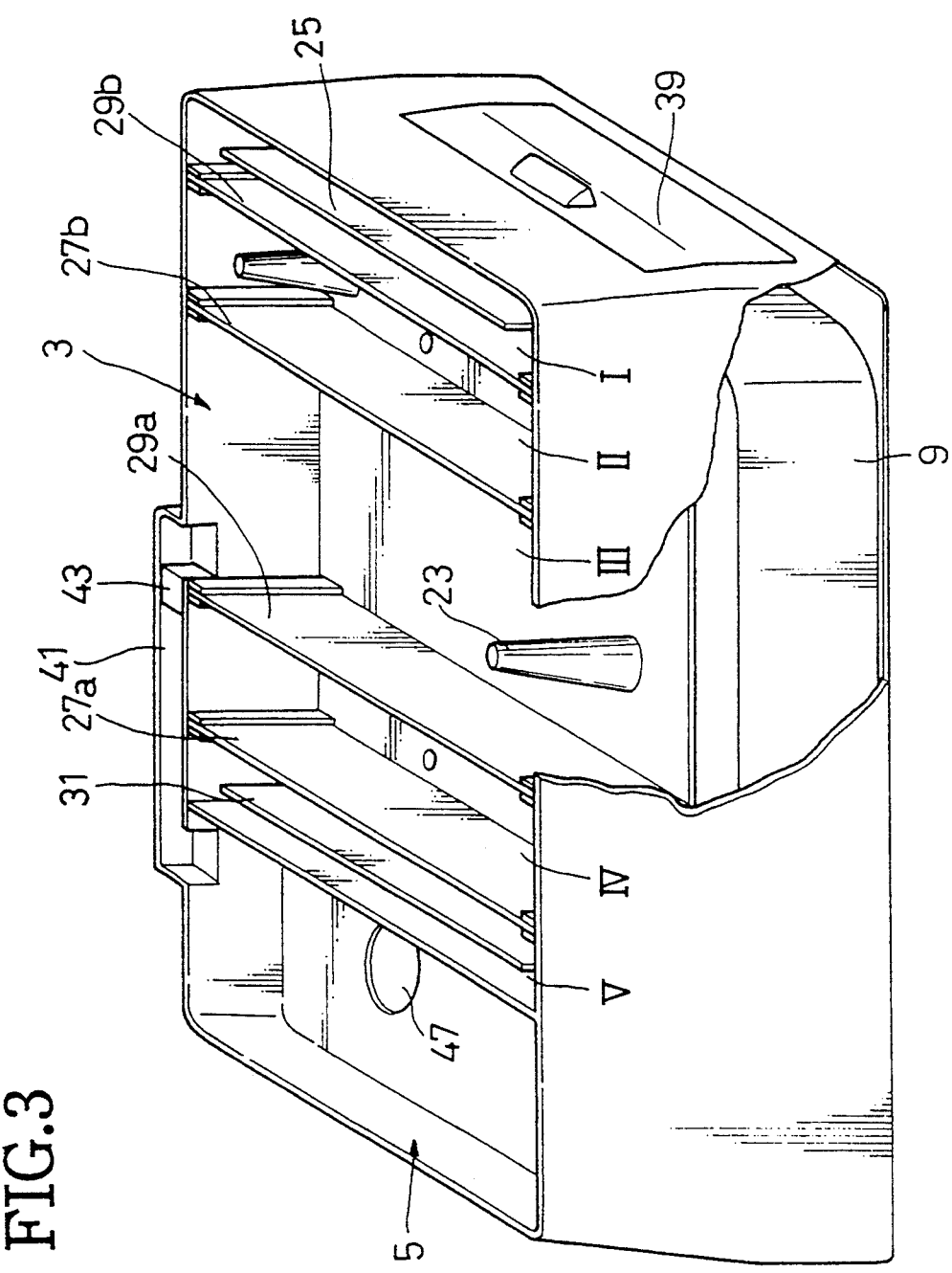

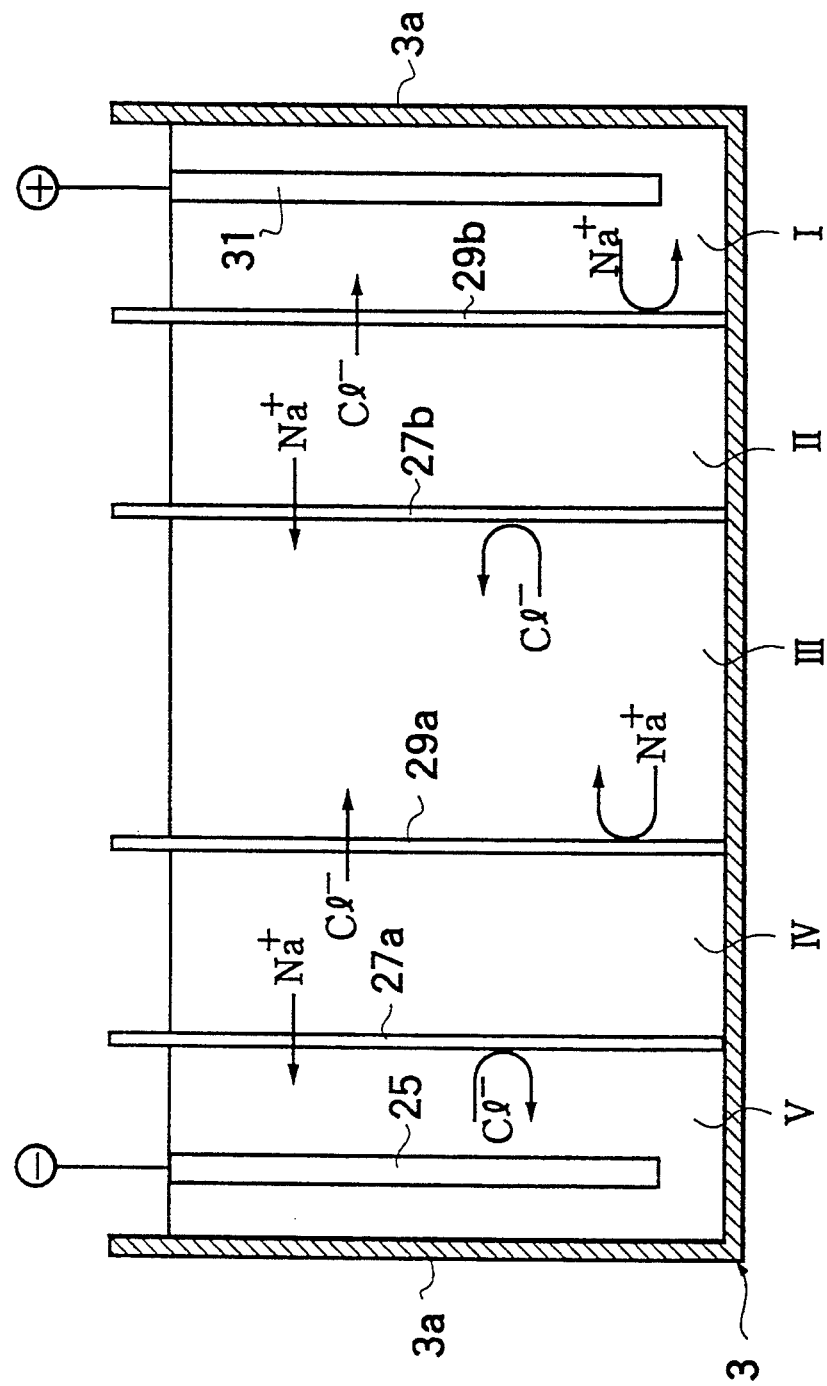

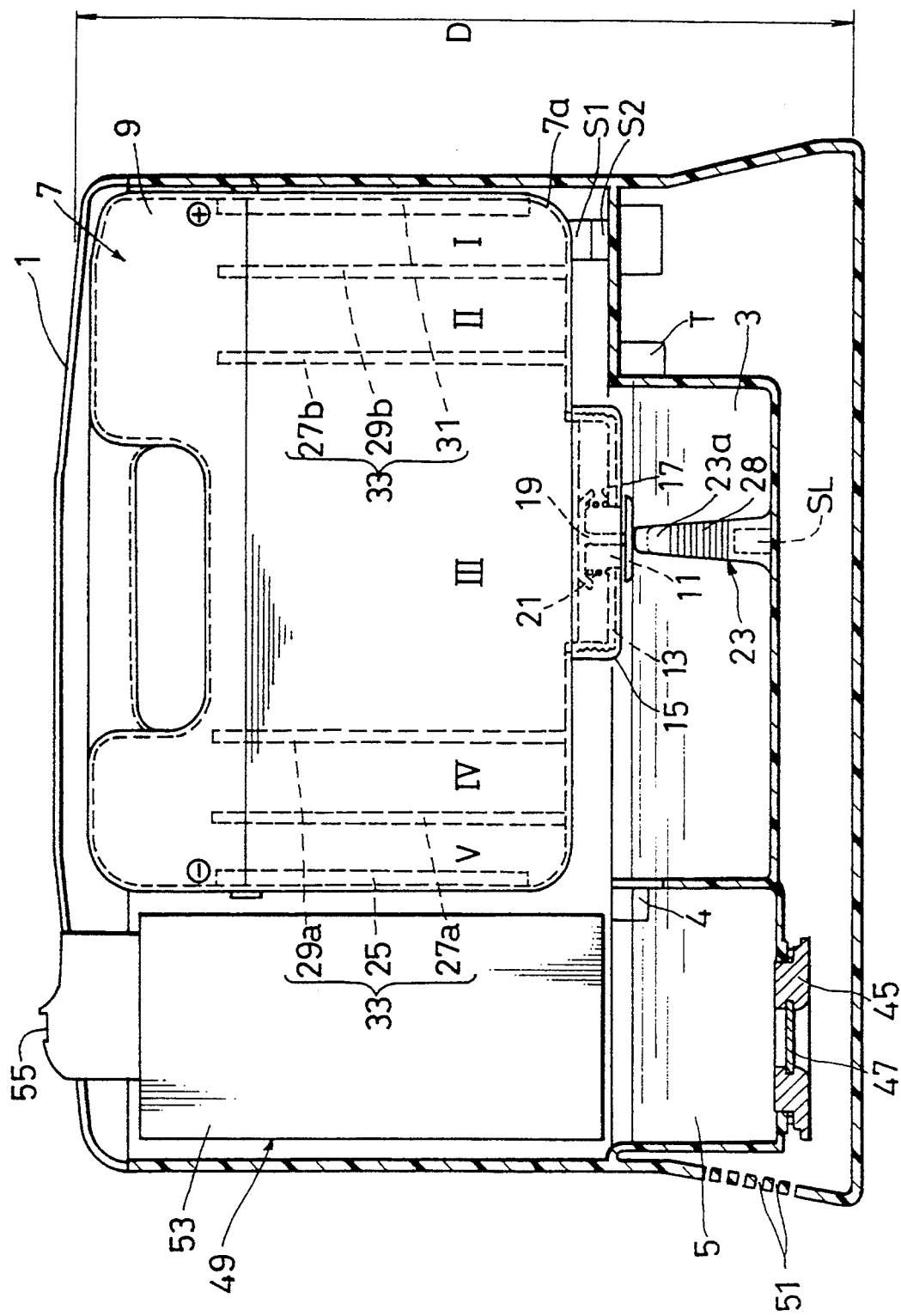

DOMESTIC ELECTRIC APPLIANCE

BACKGROUND OF THE INVENTION

1. Field of the Invention

The present invention relates to a domestic electric appliance with an electrodialytic water purifier, and particularly, to a humidifier with an electrodialytic water purifier that removes dissolved matter, which may otherwise settle and cause white spots on household effects such as furniture, from humidifying water and produces an electric field for preventing fur and bacteria from growing in water stored in the humidifier.

2. Description of the Prior Art

Domestic electric appliances such as a humidifier usually use tap water, which comes from rivers, lakes, ponds, dams, reservoirs, etc. Raw water from rivers, etc., is purified at a purification plant. In the purification plant, the raw water is passed through sedimentation and filter basins to remove suspended matter, bacteria, iron, manganese, and organic components, which may cause smells and unpleasantness, from the water. The cleaned water is still biologically active to contain or produce microbes and bacteria. Accordingly, the water is disinfected by adding chlorine gas or powder. The water is then supplied to homes, etc.

Although the tap water is clean and potable, it contains minerals, carbonic acid, chlorine ions, silica, iron, organic components, and the like. The carbonic acid in the tap water derives from carbonic acid compounds in the ground and carbon dioxide in air, the chlorine ions derive from the chlorine gas or powder used for disinfection at the purification plants, and the organic components derive from algae, bacteria, and their decomposed matter contained in raw water. These dissolved substances are not removable at the purification plants and remain in tap water.

Domestic electric appliances such as a humidifier must use such tap water containing dissolved substances. Water particles emitted from the humidifier deposit on household effects such as furniture and evaporate to leave the dissolved substances as white spots on the furniture, etc.

To prevent the white spots, water purifiers using ion exchange resin are marketed. These water purifiers are classified into a general-purpose type and a specific type exclusive for humidifiers.

The ion exchange resin removes not only the dissolved substances that cause the white spots but also residual chlorine (mainly hypochlorous acid) for disinfection. Accordingly, water passed through the ion exchange resin and stored in a tank in the water purifier may easily grow fur and bacteria. When tile humidifier with the water purifier is continuously operated, it will cause no problem of growing fur and bacteria because fresh water is always supplied into the tank through the ion exchange resin. If the humidifier is not used for a while, water in the tank may grow fur and bacteria. If this water is sprayed into air, it will cause a health problem.

The performance of the ion exchange resin quickly deteriorates and must be replaced after a certain period of use (usually about a month and a half). This increases a running cost.

Refrigerators use tap water, too. When the tap water is used as it is for making ice in the refrigerator, +minerals, chlorine ions, etc., dissolved in the water make the ice opaque to degrade its appearance.

SUMMARY OF THE INVENTION

To solve these problems, an object of the present invention is to provide a domestic electric appliance with an electrodialytic water purifier.

Another object of the present invention is to provide a humidifier with an electrodialytic water purifier for preventing white spots on household effects nor fur or bacteria in water stored in the water purifier.

In order to accomplish the objects, the present invention provides a humidifier comprising a removable water tank, an electrode tank, a storage tank, an atomizer, and a blower. The water tank has a filling port that is opened when the water tank is removably set in the humidifier. The electrode tank communicates with the filling port of the water tank. The electrode tank forms an electrodialyzer with an anode, a cathode, cation exchange films, and anion exchange films. The cation and anion exchange films serve as partition walls and are alternately arranged between the anode and the cathode. The atomizer atomizes water in the storage tank. The blower guides the atomized water and blows it outside.

In the humidifier, water is electrodialyzed in the electrode tank, atomized by the atomizer in the storage tank, and blown outside by the blower. The electrodialyzer removes dissolved substances from the water, so that mists blown out of the humidifier will never cause white spots on household effects. Although residual chlorine is also removed from the water, the water will grow no fur or bacteria for a long time in the humidifier because the anode and cathode form an electric field strongly acting on the water. In addition, the electrodialyzer requires no replacement work.

According to another aspect of the present invention, there is provided a humidifier comprising a water tank, first and second storage tanks, an electrodialyzer, an atomizer, and a blower. The electrodialyzer is formed in at least one of the storage tanks with an anode, a cathode, cation exchange films, and anion exchange films. The cation and anion exchange films serve as partition walls and are alternately arranged between tile anode and the cathode. The atomizer is disposed in the second storage tank, to atomize water in the second storage tank. The blower guides the atomized water and blows it outside.

According to still another aspect of the present invention, there is provided a humidifier comprising a removable water tank, an electrodialyzer, a storage tank, and a blower. The water tank is disposed in the humidifier and has an outlet to be opened and closed. The electrodialyzer is formed in the water tank with an anode, a cathode, cation exchange films, and anion exchange films. The cation and anion exchange films serve as partition walls and are alternately arranged between the anode and the cathode. The storage tank communicates with the water tank. The atomizer atomizes water in the storage tank. The blower guides the atomized water and blows it outside. The outlet of the water tank is controlled by valve control means, which closes the outlet for a certain period after the activation of the electrodialyzer and then opens the same. The water tank has an upper lid that is removable when filling water into the water tank.

These and other objects, features and advantages of the present invention will be more apparent from the following detailed description of preferred embodiments in conjunction with the accompanying drawings.

BRIEF DESCRIPTION OF THE DRAWINGS

FIG. 3 is a perspective view showing first and second storage tanks of the embodiment of FIG. 2;

FIG. 4 is a sectional view explaining the operation of an electrodialyzer of the embodiment of FIG. 1;

FIG. 6 is a sectional view showing a humidifier according to still another embodiment of the present invention;

FIG. 7 is a partly sectioned view showing essential part of an upper lid of the embodiment of FIG. 6.

DETAILED DESCRIPTION OF THE EMBODIMENTS

Figure 1:
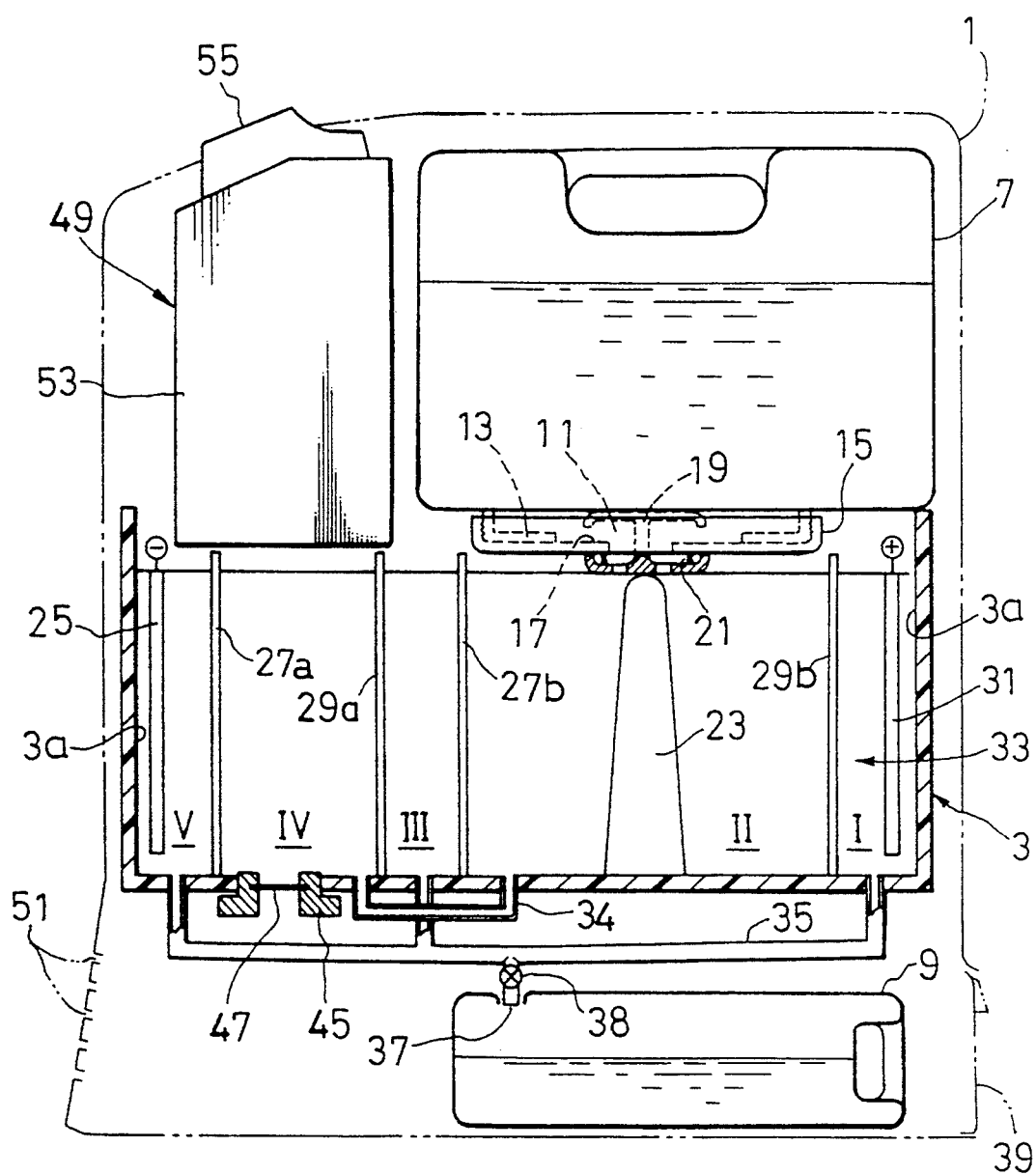
FIG. 1 is a sectional view showing a humidifier according to an embodiment of the present invention.

A humidifier according to an embodiment of the present invention will be explained with reference to FIG. 1.

The humidifier 1 has a storage tank 3. A removable water tank 7 is set on the storage tank 3. A removable drain tank 9 is set under the storage tank 3.

The water tank 7 has a threaded cylinder 13 at the bottom thereof. The threaded cylinder 13 forms a filling port 11. A cap 15 serving as a water supply plug is fastened to the threaded cylinder 13. The cap 15 is removable to pour water in the water tank 7. The cap 15 has a valve seat 17 and an open-close valve 19. The valve 19 is usually in contact with the valve seat 17 due to a force applied by a spring 21, to thereby close the filling port 11. When the water tank 7 is set in the humidifier 1, the valve 19 is pushed upwardly by a projection 23 formed in the storage tank 3, to open the filling port 11.

The storage tank 3 forms an electrodialyzer 33 with a cathode 25, a first cation exchange film 27a, a first anion exchange film 29a, a second cation exchange film 27b, a second anion exchange film 29b, and an anode 31.

The anode 31 repels cations (cathodic ions) and attracts anions (anodic ions) dissolved in tap water.

The first and second cation exchange films 27a and 27b serve as partition walls, and when a DC voltage is applied to the electrodes 25 and 31, selectively transmit cations.

The first and second anion exchange films 29a and 29b serve as partition walls, and when a DC voltage is applied to the electrodes 25 and 31, selectively transmit anions.

The cathode 25 repels anions and attracts cations dissolved in tap water.

In the storage tank 3, a first chamber I is defined between the second anion exchange film 29b and an outer wall 3a of the storage tank 3. The anode 31 is located in the first chamber I. A second chamber II is defined between the second anion exchange film 29b and the second cation exchange film 27b. A third chamber III is defined between the second cation exchange film 27b and the first anion exchange film 29a. A fourth chamber IV is defined between the first anion exchange film 29a and the first cation exchange film 27a. A fifth chamber V is defined between the first cation exchange film 27a and the external wall 3a of the storage tank 3. The cathode 25 is located in the fifth chamber V.

The operation of the electrodialyzer 33 will be explained with reference to FIG. 4.

When a voltage is applied to the cathode 25 and anode 31, anions Cl− in the second chamber II are transmitted through the second anion exchange film 29b into the first chamber I. Cations Na+ in the second chamber II are transmitted through the second cation exchange film 27b into the third chamber III. Cations Na+ in the first chamber I are repelled by the second anion exchange film 29b and stay in the first chamber I. Anions Cl− in the third chamber III are repelled by the second cation exchange film 27b and stay in the third chamber III. As a result, water in the second chamber II is purified.

Cations Na+ in the fourth chamber IV are transmitted through the first cation exchange film 27a into the fifth chamber V. Anions Cl− in the fourth chamber IV are transmitted through the first anion exchange film 29a into tile third chamber III. Anions Cl− in the fifth chamber V are repelled by the first cation exchange film 27a and stay in the fifth chamber V. Cations Na+ in the third vessel III are repelled by the first anion exchange film 29a and stay in the third chamber III. As a result water in the fourth chamber IV is purified.

The second and fourth chambers II and IV containing the purified water are connected to each other. The first, third, and fifth chambers I, III, and V are connected to an inlet 37 of the drain tank 9 through a drain pipe 35. A drain valve 38 of the drain pipe 35 is opened to drain water with concentrated dissolved ions from the chambers I, III, and V into the drain tank 9.

The drain tank 9 is removable through a door 39 formed at lower part of the humidifier 1. When the drain tank 9 becomes full of drain water, it is removed and emptied.

An ultrasonic element 47 is supported by an element holder 45, which is fixed to the bottom of the fourth chamber IV containing the purified water. The ultrasonic element 47 oscillates to atomize the purified water.

A blower 49 having a fan (not shown) is disposed over the fourth chamber IV. The fan draws outside air through an inlet 51 formed at lower part of the humidifier 1. The air and atomized water are guided upwardly through a guide cylinder 53 and are blown outside through a blow port 55.

In the humidifier 1, water in the water tank 7 is fed into the storage tank 3 through the filling port 11, purified by the electrodialyzer 33, atomized by the ultrasonic element 47 in the fourth chamber IV, guided through the guide cylinder 53, and blown outside from the blow port 55. Since dissolved substances and chlorine are removed from tap water by the electrodialyzer 33, the atomized water blown from the blow port 55 never causes white spots on household effects.

The electrodes 25 and 31 form an electric field acting on the tap water in the storage tank 3, so that the water may cause no fur or bacteria for a long time.

In addition, the electrodialyzer 33 requires no replacement work.

Figure 2:
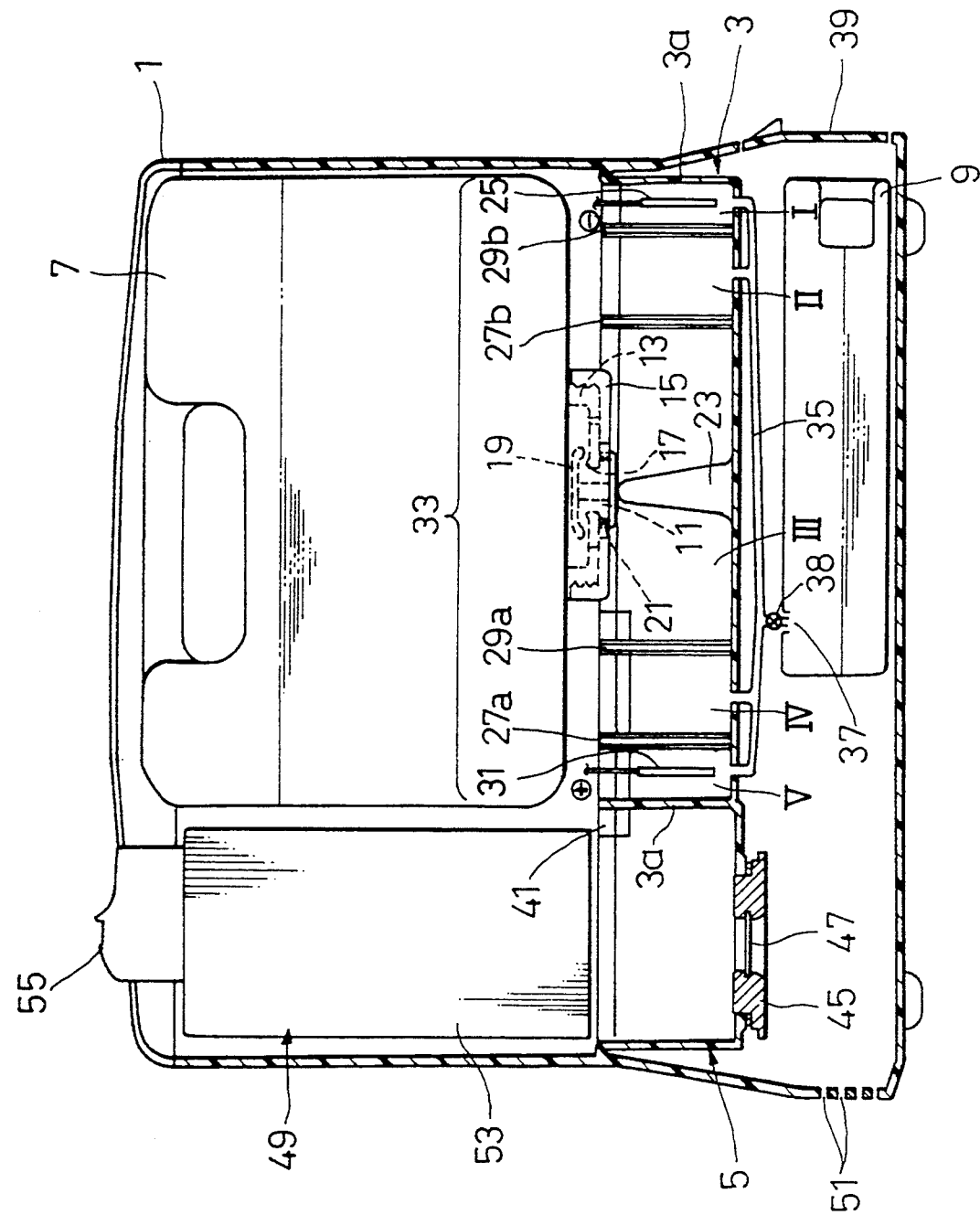
FIG. 2 is a sectional view showing a humidifier according to another embodiment of the present invention.

FIGS. 2 and 3 show a humidifier according to another embodiment of the present invention.

This embodiment employs first and second storage tanks 3 and 5. The same parts as those of the first embodiment are represented with like reference marks.

In FIGS. 2 and 3, an anode 31 is located on the left-hand side and a cathode 25 on the right-hand side, to purify water in a third chamber III. The first and second storage tanks 3 and 5 are integral with each other. A removable water tank 7 is disposed on the first storage tank 3. A removable drain tank 9 is disposed under the first storage tank 3.

The water tank 7 has a threaded cylinder 13 at the bottom thereof. The threaded cylinder 13 forms a filling port 11. A cap 15 serving as a water supply plug is fastened to the threaded cylinder 13. The cap 15 is removable to pour water in the water tank 7. The cap 15 has a valve seat 17 and an open-close valve 19. The valve 19 is usually in contact with the valve seat 17 due to force applied by a spring 21, to thereby close the filling port 11. When the water tank 7 is set in the humidifier 1, the valve 19 is pushed upwardly by a projection 23 formed in the first storage tank 3, to open the filling port 11.

The tank 3 forms an electrodialyzer 33 with the anode 31, a first cation exchange film 27a, a first anion exchange film 29a, a second cation exchange film 27b, a second anion exchange film 29b, and the cathode 25.

The anode 31 repels cations and attracts anions dissolved in tap water.

The first and second cation exchange films 27a and 27b serve as partition walls, and when a DC voltage is applied to the electrodes 25 and 31, transmit cations only.

The first and second anion exchange films 29a and 29b serve as partition walls, and when a DC voltage is applied to the electrodes 25 and 31, transmit anions only.

The cathode 25 repels anions and attracts cations dissolved in tap water.

In the storage tank 3, a fifth chamber V is defined between the first cation exchange film 27a and an outer wall 3a of the first storage tank 3. The anode 31 is located in the fifth chamber V. A fourth chamber IV is defined between the first cation exchange film 27a and the first anion exchange film 29a. A third chamber III is defined between the first anion exchange film 29a and the second cation exchange film 27b. A second chamber II is defined between the second cation exchange film 27b and the second anion exchange film 29b. A first chamber I is defined between the second anion exchange film 29b and the external wall 3a of the first storage tank 3. The cathode 25 is located in the first chamber I.

Figure 5:
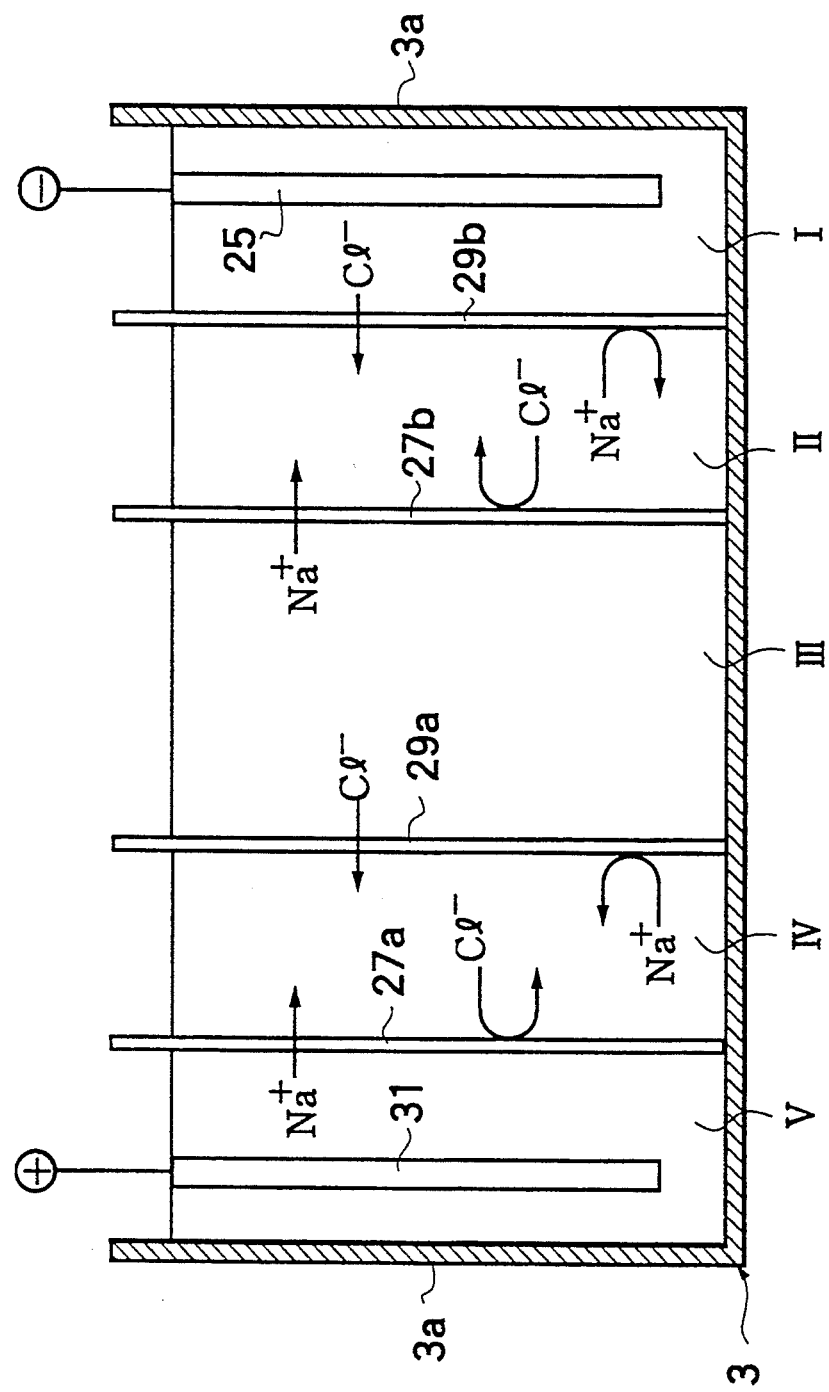
FIG. 5 is a sectional view explaining the operation of an electrodialyzer of the embodiment of FIG. 2.

FIG. 5 shows movements of cations Na+ and anions Cl− in the first storage tank 3.

The first chamber I, second chamber II, fourth chamber IV, and fifth chamber V of the first storage tank 3 are connected to an inlet 37 of the drain tank 9 through a drain pipe 35. A drain valve 38 of the drain pipe 35 is opened to drain water with concentrated dissolved ions from the chambers I, II, IV, and V into the drain tank 9.

The drain tank 9 is removable through a door 39 formed at lower part of the humidifier 1. When the drain tank 9 becomes full of drain water, it is removed and emptied.

The second storage tank 5 communicates with the third chamber III of the first storage tank 3 through a path 41 as shown in FIG. 3. An open-close valve 43 is disposed in the path 41. The valve 43 is closed for a predetermined time after the water tank 7 is set in the humidifier 1, to prevent unprocessed water from flowing into the second storage tank 5. After the predetermined closure time, the valve 43 is opened.

An ultrasonic element 47 is supported by an element holder 45, which is fixed to the bottom of the second storage tank 5. The ultrasonic element 47 oscillates to atomize water in the second storage tank 5.

A blower 49 having a fan (not shown) is disposed over the tank 5. The fan draws outside air through an inlet 51 formed at lower part of the humidifier 1. The air and atomized water are guided upwardly through a guide cylinder 53 and are blown outside through a blow port In the humidifier 1, water in the water tank 7 is fed into the first storage tank 3 through the filling port 11, processed by the electrodialyzer 33, sent into the second storage tank 5, atomized by the ultrasonic element 47, guided through the guide cylinder 53, and blown outside from the blow port 55. Since dissolved substances and chlorine are removed from tap water by the electrodialyzer 33, the atomized water blown from the blow port 55 never causes white spots on household effects.

The anode 31 and cathode 25 form an electric field acting on the water in the first storage tank 3, so that the water may cause no fur or bacteria for a long time.

In addition, the electrodialyzer 33 requires no replacement work.

Although the electrodialyzer 33 is disposed in the first storage tank 3 according to the second embodiment, the electrodialyzer 33 may be arranged in each of the first and second storage tanks 3 and 5, or only in the second storage tank 5.

FIG. 6 shows a humidifier according to still another embodiment of the present invention. Unlike the previous embodiments that arrange an electrodialyzer in a storage tank of a humidifier, the embodiment of FIG. 6 forms an electrodialyzer 33 in a water tank 7.

The electrodialyzer 33 in the water tank 7 comprises a cathode 25, a first cation exchange film 27a, a first anion exchange film 29a, a second cation exchange film 27b, a second anion exchange film 29b, and an anode 31.

A tank body 7a of the water tank 7 has a contact S1. The humidifier 1 has a contact S2. When the contact S1 is brought in contact with the contact S2, a current flows from a power source to the electrodes 25 and 31 of the electrodialyzer 33.

In FIG. 7, an upper lid 9 of the water tank 7 is fitted to an upper edge 7b of the tank body 7a through a seal ring 22. A lock arm 26 fixed to the tank body 7a engages with a stopper 24 formed on the periphery of the upper lid 9.

The lock arm 26 is made of elastic synthetic resin and is usually at a locked position indicated with a continuous line. When an outward force is applied by fingers, the lock arm 26 is released from the stopper 24 into an unlocked state indicated with a dotted line.

A projection 23 formed in a storage tank 3 has a tip 23a, which is moved upwardly or downwardly by a solenoid SL. Movable parts of tile projection 23 are covered with a bellows 28 in a watertight manner.

When the tank body 7a is set in the humidifier 1 as shown in FIG. 6, the contact S1 of the tank body 7a is brought in contact with tile contact S2 of the humidifier 1. As a result, a timer T is turned ON to turn OFF the solenoid SL for a set period. After the set period, the solenoid SL is turned ON to extend the projection 23.

The tip 23a of the projection 23 then pushes up and opens an open-close valve 19.

This arrangement never lets unprocessed water flow from the water tank 7 into the storage tank 3 just after the tank 7 is set in the humidifier 1.

Although this embodiment employs the timer T to control the solenoid SL, the solenoid SL may be controlled in response to an ion concentration in the tank 7.

The humidifier according to this embodiment is compact because the electrodialyzer 33 is formed in the water tank 7. By removing the upper lid 9, one can quickly pour water into the water tank 7. Water in the water tank 7 is purified by the electrodialyzer 33 and fed into a storage tank 5, In which the purified water is atomized by an atomizer 47 and blown outside.

Dissolved substances that may cause white spots are removed from water by tile electrodialyzer 33. Although the electrodialyzer 33 removes residual chlorine, too, from the water in the water tank 7, the water will grow no fur or bacteria for a long time because the electrodes 25 and 31 of the electrodialyzer 33 form an electric field that strongly acts on the dialyzed water in the water tank 7.

Figure 8:
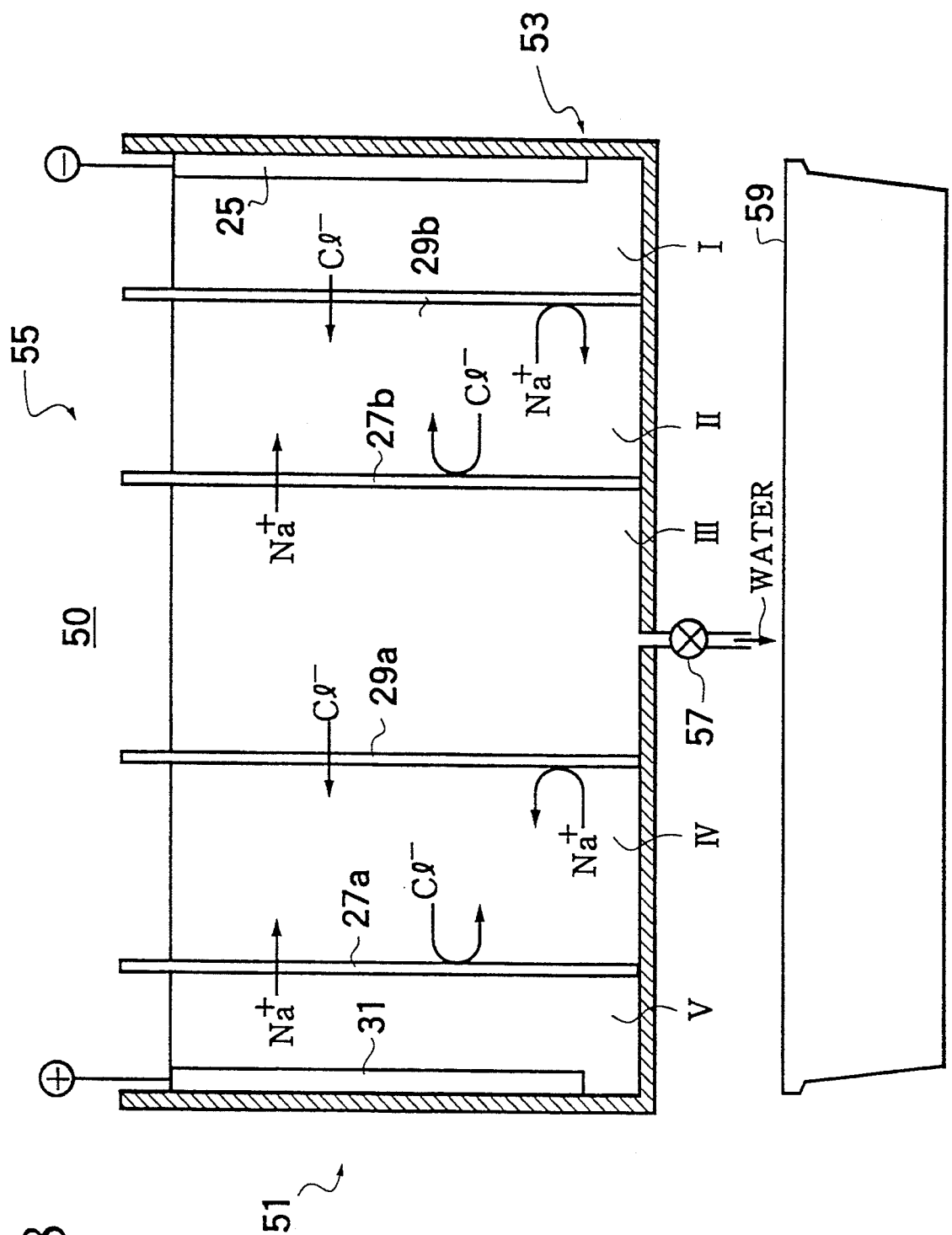
FIG. 8 is a view showing an ice maker of a refrigerator according to the present invention.

FIG. 8 shows another embodiment of the present invention. Unlike the previous embodiments that employ an electrodialyzer for a humidifier, the embodiment of FIG. 8 employs an electrodialyzer 55 for an ice maker 51 of a freezer 50 in a refrigerator.

The electrodialyzer 55 is formed in a water tank 53. Water is supplied to and purified in the water tank 53. After a predetermined period, the purified water is fed into an ice tray 59 through a valve 57. Ice formed in the tray 59 has a good appearance because dissolved substances have been removed from the water by the electrodialyzer 55.

In summary, the present invention provides domestic electric appliances such as a humidifier with an electrodialyzer that prevents white spots from depositing on household effects. Water in the electrodialyzer grows no fur or bacteria for a long time because the electrodialyzer produces an electric field that strongly acts on the water. Since the electrodialyzer also removes residual ions from water, no scale will accumulate on the surface of an ultrasonic atomizer, to thereby improve the service life and performance of the atomizer. In addition, the electrodialyzer requires no replacement work, to reduce a running cost.

Various modifications will become possible for those skilled in the art after receiving the teachings of the present disclosure without departing from the scope thereof.

What is claimed is:

1. A domestic electric appliance comprising:
   a removable tank for reserving water;
   water purifying means employing an electrodialytic mechanism having an anode, a cathode, cation exchange films, and anion exchange films, the cation and anion exchange films being alternately arranged between the anode and the cathode and serving as partition walls; and
   means for using the water purified by said water purifying means wherein said water purifying means is located inside of said removable tank.

2. The domestic electric appliance according to claim 1, wherein said purified water using means is an atomizer for atomizing the purified water.

3. A humidifier comprising:
   a removable water tank disposed in the humidifier and having an outlet that is opened and closed through an open-close valve;
   an electrodialytic mechanism formed in said water tank and having an anode, a cathode, cation exchange films, and anion exchange films, the cation and anion exchange films being alternately arranged between the anode and the cathode and serving as partition walls;
   a storage tank communicating with the outlet of said water tank;
   an atomizer for atomizing water in said storage tank; and
   a blower for guiding the atomized water and blowing the same outside wherein said anode and said cathode are formed on opposite inside walls of said removable water tank.

4. The humidifier according to claim 3, further comprising:
   open-close control means for closing the open-close valve for a predetermined period after the activation of said electrodialytic mechanism and then opening the open-close valve.

5. The humidifier according to claim 3, wherein said water tank has an upper lid that is removable to expose the inside of said water tank.

* * * * *